(12) United States Patent
Bundy (10) Patent No.: US 6,749,035 B2
(45) Date of Patent: Jun. 15, 2004

(54) PITCH ALLEVIATION SYSTEM

(75) Inventor: John E. Bundy, Racine, WI (US)

(73) Assignee: Case Corporation, Racine, WI (US)

( * ) Notice: Subject to any disclaimer, the term of this patent is extended or adjusted under 35 U.S.C. 154(b) by 87 days.

(21) Appl. No.: 10/216,572

(22) Filed: Aug. 9, 2002

(65) Prior Publication Data

US 2004/0026880 A1 Feb. 12, 2004

(51) Int. Cl.$^7$ .............................................. B60G 21/00
(52) U.S. Cl. ........................ 180/41; 172/7; 280/5.513; 701/50
(58) Field of Search ..................... 280/5.513, 5.514, 280/6.157, 6.159; 180/41, 290, 53.3; 172/7; 701/38, 50

(56) References Cited

U.S. PATENT DOCUMENTS

| | | | | |
|---|---|---|---|---|
| 4,343,365 A | * | 8/1982 | Rajagopal et al. | 172/7 |
| 4,518,044 A | * | 5/1985 | Wiegardt et al. | 172/7 |
| 4,809,785 A | * | 3/1989 | Arnold et al. | 172/9 |
| 4,979,092 A | * | 12/1990 | Bergene et al. | 701/50 |
| 5,421,416 A | * | 6/1995 | Orbach et al. | 172/7 |
| 5,890,870 A | | 4/1999 | Berger et al. | |
| 5,897,287 A | | 4/1999 | Berger et al. | |
| 6,145,859 A | * | 11/2000 | Altherr et al. | 280/5.514 |
| 6,196,327 B1 | | 3/2001 | Patel et al. | |

FOREIGN PATENT DOCUMENTS

EP     280376 A2 * 8/1988 ......... A01B/63/111

* cited by examiner

*Primary Examiner*—Peter C. English
(74) *Attorney, Agent, or Firm*—John William Stader; Collin A. Webb (57) ABSTRACT

A hitch control system for a work vehicle combines a front suspension position signal, a hitch load signal and a hitch position signal to generate a valve command signal that controls hitch position so as to alleviate pitching and maximize front wheel ground contact time.

16 Claims, 4 Drawing Sheets

PITCH ALLEVIATION SYSTEM

FIELD OF THE INVENTION

The invention relates to electronic ride control systems for work vehicles. More particularly, it relates to ride control systems for agricultural tractors using the position of a front suspension as feedback to the electronic ride control system to reduce vehicle pitching and to increase front wheel ground contact time.

BACKGROUND OF THE INVENTION

The motion of any body can be fully described in three dimensions, by defining three orthogonal axes, surge (longitudinal), sway (lateral), heave (vertical)) and the angular rotation about those axes (roll, pitch, yaw).

Operator ride, comfort, safety and vehicle motion depend on the combined effect of, the excursions and frequency distribution of each degree of freedom, and the interaction of each significant mass/elastic element in the system (cab, seat, suspension, etc). This varies significantly from one operating condition to another, and can be particularly complex when in work mode. Tasks such as plowing may require compensation in all six degrees for full operator isolation.

Even when roading, uncomfortable pitch, heave and shock excursions can build up, to the extent that the front wheels can lose ground contact for substantial periods of time, causing a significant loss of yaw control. This motion results from the vehicle's dynamic response to externally applied terrain inputs and other disturbances such as those induced by hitch (implement) motion, suspension and wheel eccentricities etc. Unintended cross talk (interaction) between otherwise independently controlled subsystems (e.g. suspension and hitch control) can additionally exacerbate this problem.

In addition to operator comfort and controllability, safety becomes a concern at the higher (20–50 kph) speeds.

Fortunately, the motion of a tractor/implement combination, on the road, is predominately in pitch, heave and to a lesser extent surge (the vertical plane), as is the effect of hitch and front suspension movement, and this is the focus of this invention.

One of the primary causes of this unwanted motion in agricultural tractors is due to overhanging loads that extend outward and behind. These overhanging loads, such as implements coupled to the vehicle are attached to tractors by three-point hitches, a common hitch arrangement used to couple implements to tractors. These hitches have one or more hydraulic actuators, such as hydraulic cylinders, that lift the hitch thereby holding the hitch-mounted implement outward away from the rear of the tractor above the ground. These hitch-mounted implements may be quite heavy, and as large cantilevered loads tend to pivot the tractor about its rear wheels in a manner that lifts the front end of the tractor in the air.

Electronic ride control systems, such as those described in U.S. Pat. Nos. 5,897,287, 5,890,870, and 6,196,327 improve the ride by decoupling the inertia of the hitch and hitch-mounted implement from the chassis of the tractor itself. They do this by dynamically raising and lowering the implement in response to signals received from load pins and hitch position sensors.

Current electronic ride control systems, however, are limited in that they can only sense a limited number of motions of the vehicle. In particular, they sense the loads and positions of components at the rear of the vehicle and not at the front of the vehicle. What is needed therefore is an electronic ride control system that combines the traditional control using hitch height and hitch load with additional position information provided by an additional vehicle position sensor.

It is an object of this invention to provide such a system.

This system includes an enhancement to existing control strategies and an extension of existing system's capability due to the use of sensor inputs from the additional sub-systems (controlled elements) that may be fitted to the vehicle. They provide the potential for implementing a better set of control algorithms and strategies, based on the equipment fit and knowledge of the vehicle dynamics.

This invention provides additional and immediate functionality, to improve operator selectable ride quality features and, obviate potentially adverse cross talk (interaction) between otherwise independently controlled subsystems (e.g. front suspension and ride control).

Secondary advantages include, lower shock loads to the hitch implement structure and couplings, lower operator fatigue, improved controllability (front wheels on ground longer), enhanced safety, higher permissible road speeds (important in Europe), and alleviation of 'porpoising', etc.

OBJECTS AND SUMMARY OF THE INVENTION

In accordance with a first embodiment of the invention, a tractor having a ride control system that controls tractor pitching is provided, including a chassis; an engine mounted on the chassis; a hydraulic pump coupled to and driven by the engine to provide a flow of pressurized hydraulic fluid; a front suspension including two front wheels disposed on opposing sides of the chassis and supported by at least one front suspension hydraulic actuator configured to raise and lower the two front wheels with respect to the chassis; a front suspension sensor coupled to the front suspension to generate a signal indicative of the position of the front suspension with respect to the chassis; two rear wheels coupled to the chassis to rotate with respect thereto and drive the vehicle over the ground; a multi-point hitch coupled to the rear of the chassis and configured to be coupled to an overhanging load extending from the rear of the chassis; a hitch position sensor coupled to the hitch to provide a signal indicative of an elevation of the hitch with respect to the chassis; a hitch hydraulic actuator coupled to the hitch to raise and lower the hitch with respect to the chassis; at least one load sensor coupled to the chassis to provide a signal indicative of a load on the hitch; at least one electrically actuated hitch control valve coupled to and between the pump and the hitch hydraulic actuator to regulate the flow of pressurized hydraulic fluid to the hitch hydraulic actuator; an electronic control circuit coupled to and responsive to the front suspension sensor, the at least one load sensor, the hitch position sensor, and configured to drive the hitch control valve to control the flow of pressurized hydraulic fluid to the hitch hydraulic actuator in real time to reduce tractor pitching.

The electronic control circuit may include at least one feedback control circuit configured to automatically, periodically, and repeatedly receive the signals of the front suspension sensor, the at least one load sensor and the hitch position sensor, to combine the signals, to generate a valve control signal therefrom, and to apply the valve control signal to the hitch control valve (or valves) to vary a degree of opening of the hitch control valve (or valves).

The electronic control circuit may be configured to sample the signals of the front suspension sensor, the at least one load sensor and the hitch position sensor at least once every 50 milliseconds and to generate the valve control signal at least once every 50 milliseconds, more preferably at least every 20 milliseconds, and even more preferably, at least every 10 milliseconds.

The tractor may include at least one front suspension hydraulic control valve coupled to and between the pump and the at least one front suspension hydraulic actuator to control the height of the front suspension, and further wherein the front suspension hydraulic control valve is coupled to and driven by the electronic control circuit.

The electronic control circuit may include a first digital microprocessor coupled to the front suspension control valve and the front suspension sensor; a second digital microprocessor coupled to the hitch position sensor and the at least one load sensor; and a CAN (controller area network) bus coupling the first and second digital microprocessors and configured to transmit the signal indicative of the position of the front suspension with respect to the chassis from the first digital microprocessor to the second digital microprocessor.

The second microprocessor may be coupled to the hitch control valve and configured to receive the signal indicative of the front position sensor over the CAN bus, to combine that signal with the hitch position sensor signal and the load sensor signal, to generate a valve control signal therefrom, and to apply the valve control signal to the hitch control valve to vary a degree of opening of the hitch control valve.

In accordance with a second embodiment of the invention, a method of electronically reducing pitching in a tractor is provided, including the steps of (a) receiving an electrical signal from a front suspension sensor indicating the position of a front suspension; (b) receiving an electrical signal from a hitch position sensor indicating the height of a hitch with respect to a chassis; (c) receiving an electrical signal from at least one load sensor indicative of a load experienced by the hitch; (d) combining the front suspension sensor signal, the hitch position sensor signal and the load sensor signal; (e) generating a hitch hydraulic actuator signal calculated to drive the hitch upward or downward with respect to the chassis; and (f) driving the hitch upward or downward with respect to the chassis to thereby reduce tractor pitching. These steps (a)–(f) may be automatically and repeatedly executed at least once every 50 milliseconds.

The method may include the step of transmitting the front suspension sensor signal from a first microprocessor coupled to the front suspension sensor to a second microprocessor, and the step of combining may include the step of combining the front suspension sensor signal, the hitch position sensor signal and the at least one load sensor signal in the second microprocessor.

The step of generating a hitch hydraulic actuator signal may include the step of generating the hydraulic actuator signal in the second microprocessor and applying the hydraulic actuator signal to a valve that is fluidly coupled to and between a hydraulic pump and a hitch hydraulic actuator to regulate a flow of hydraulic fluid from the pump to the actuator.

In accordance with a third embodiment of the invention, a work vehicle having a ride control system that controls vehicle pitching is provided, the vehicle including a chassis; an engine mounted on the chassis; a hydraulic pump coupled to and driven by the engine to provide a flow of pressurized hydraulic fluid; a front suspension including two front wheels disposed on opposing sides of the chassis and supported by at least one front suspension hydraulic actuator configured to raise and lower the two front wheels with respect to the chassis; a front suspension sensor coupled to the front suspension to generate a signal indicative of the position of the front suspension with respect to the chassis; two rear wheels coupled to the chassis to rotate with respect thereto and drive the vehicle over the ground; a hitch coupled to the rear of the chassis and configured to be coupled to an overhanging load extending from the chassis; a hitch position sensor coupled to the hitch to provide a signal indicative of an elevation of the hitch with respect to the chassis; a hitch hydraulic actuator coupled to the hitch to raise and lower the hitch with respect to the chassis; at least one load sensor coupled to the chassis to provide a signal indicative of a load on the hitch; at least one electrically actuated hitch control valve coupled to and between the pump and the hitch hydraulic actuator to regulate the flow of pressurized hydraulic fluid to the hitch hydraulic actuator; and an electronic control circuit coupled to and responsive to the front suspension sensor, the load sensor, the hitch position sensor, and the hitch control valve to control the flow of pressurized hydraulic fluid to the hitch hydraulic actuator in real time to reduce vehicle pitching.

The electronic control circuit may include at least one feedback control circuit configured to automatically, periodically, and repeatedly receive the signals of the front suspension sensor, the at least one load sensor and the hitch position sensor, to combine the signals, to generate a valve control signal therefrom, and to apply the valve control signal to the hitch control valve to vary a degree of opening of the hitch control valve.

The electronic control circuit may be configured to sample the signals of the front suspension sensor, the at least one load sensor and the hitch position sensor at least once every 50 milliseconds and to generate the valve control signal at least once every 50 milliseconds.

The work vehicle may include at least one front suspension hydraulic control valve coupled to and between the pump and the at least one front suspension hydraulic actuator to control the height of the front suspension, and further wherein the front suspension hydraulic control valve is coupled to and driven by the electronic control circuit.

The electronic control circuit may include a first digital microprocessor coupled to the front suspension control valve and the front suspension sensor; a second digital microprocessor coupled to the hitch position sensor and the at least one load sensor; and a CAN bus coupling the first and second digital microprocessors and configured to transmit the signal indicative of the position of the front suspension with respect to the chassis from the first digital microprocessor to the second digital microprocessor.

The electronic control circuit may be configured to sense a front suspension sensor signal indicative of the front wheels lifting off the ground and to lower the hitch responsively.

The signal indicative of the wheels lifting off the ground may be generated by the front suspension sensor signal using a dynamic model that predicts that the wheels will leave the ground.

DETAILED DESCRIPTION OF THE PREFERRED EMBODIMENT

Figure 1:
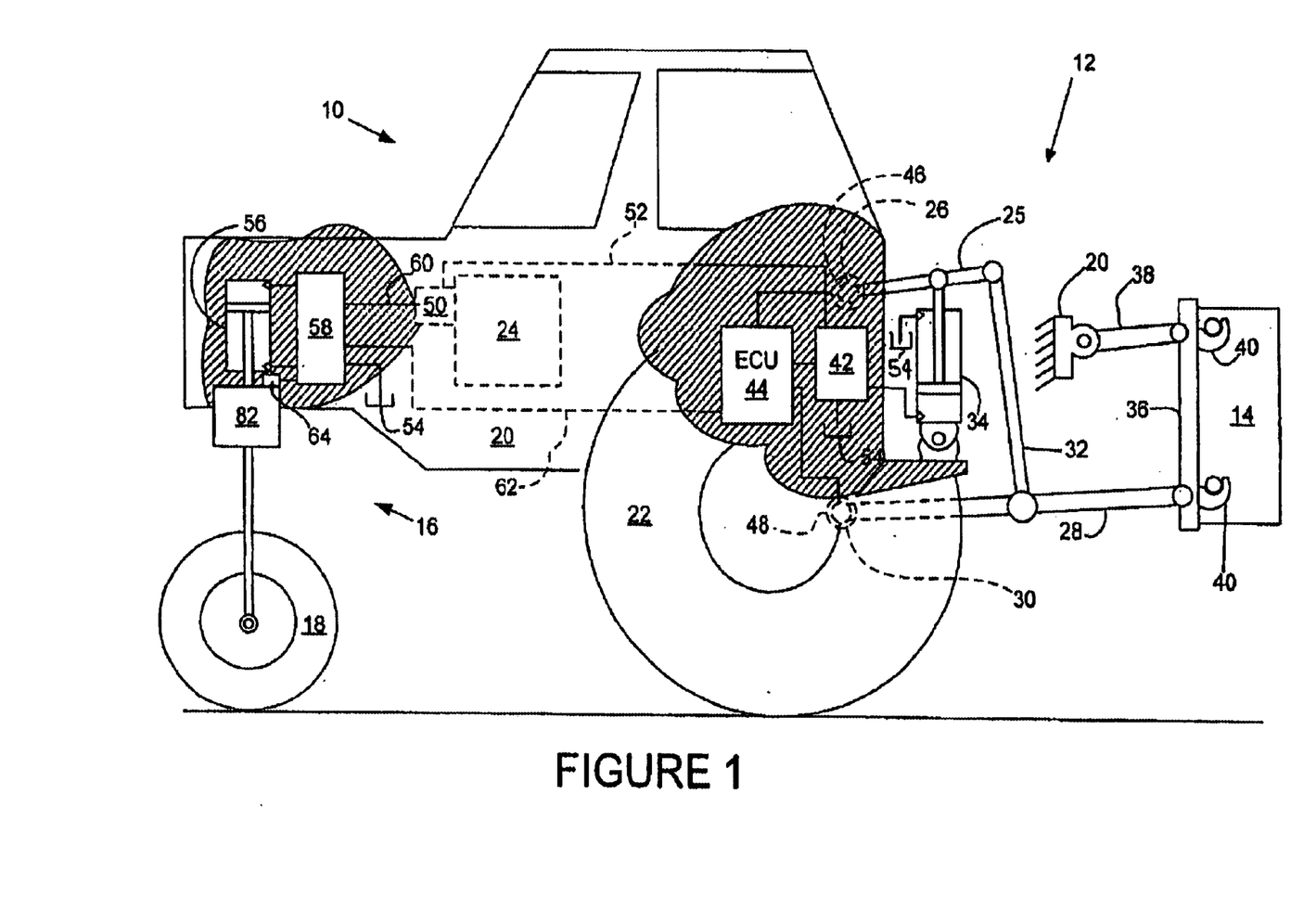
FIG. 1 shows a typical tractor hardware arrangement in which the tractor can be considered as a solid body (mass) supported by front and rear spring/dampers (tires). There are two articulating elements, the front suspension and the hitch.

FIG. 1 illustrates a work vehicle here embodied as an agricultural tractor 10 that includes a hitch 12 to which an implement 14 is coupled. Tractor 10 has a front suspension 16 that permits front wheels 18 to move up and down with respect to the vehicle chassis or frame 20. Two rear wheels 22 are coupled to chassis 20 and drive the tractor over the ground. An engine 24 is coupled to the chassis and drives rear wheels 22 in rotation through a transmission and shaft arrangement (not shown) of conventional design.

Hitch 12 is configured as what is commonly called a "three-point" hitch. It includes an upper link 25 that is coupled to and rotationally pivots with respect to chassis 20 at its forward end 26. Hitch 12 also includes a lower link 28 that is similarly coupled to and pivotable with respect to chassis 20 at its forward end 30. Upper link 25 and lower link 28 are coupled together with a floating link 32, which is pivotably coupled at its upper end to upper link 25 and has a lower end that is pivotably coupled to lower link 28. A hydraulic actuator here shown as hydraulic cylinder 34 is coupled to and between upper link 25 and chassis 20. When cylinder 34 extends, it rotates upper link 25 in a counter-clockwise direction (as shown in FIG. 1). This raises the rear end of upper link 25. This causes floating link 32 to be raised. Floating link 32, in turn, raises lower link 28 by causing it to rotate counter-clockwise (as shown in FIG. 1) about its forward end which is pivotably coupled to chassis 20. In sum, when cylinder 34 extends, it raises the rear end of lower link 28 and when cylinder 34 retracts, it lowers the rear end of lower link 28. The function of the upper link and the floating link are merely to transmit the raising and lowering forces to the lower link.

Hitch 12 also includes a hitch plate 36 that is pivotably coupled at its lower end to the rear end of lower link 28. The upper end of hitch plate 36 is pivotably coupled to hitch link 38 that is pivotably coupled to chassis 20 at its forward end.

Implement 14 is removably coupled to hitch plate 36 by latches 40 which extend from hitch plate 36 and are configured to engage mating protrusions on implement 14. In FIG. 1, a side view of tractor 10, only two latches 40 are shown. In common use, there are three such latches, and thus the name "three-point hitch" for this arrangement.

It should be clear from the above description of the various mechanical elements that implement 14 is raised whenever cylinder 34 is extended and implement 14 is lowered whenever cylinder 34 is retracted. It should also be clear that implement 14, when raised above the ground, acts as a cantilevered mass coupled to the rear of tractor 10 that tends to lift front wheels 18 off the ground and cause tractor 10 to pitch. If the mass of implement 14 is high enough, the entire tractor/implement pair will rotate clockwise (as shown in FIG. 1) about the point of contact of the rear wheels with respect to the ground. It is one of the functions of the invention described herein to reduce such pitching and the likelihood that front wheels 18 will be lifted off the ground.

To control this pitching and other unwanted oscillation of tractor 10, cylinder 34 is actively driven up and down as the vehicle travels down the road or over the ground by valves 42. These valves are connected to an extend port of cylinder 34, thereby permitting them to both extend and retract cylinder 34. Valves 42 are coupled to electronic control unit (ECU) 44, which calculates the appropriate signal to be applied to valves 42 according to its internal mathematical models and algorithms. ECU 44 is also coupled to a hitch position sensor shown in FIG. 3 as potentiometer 46. Potentiometer 46 is coupled to and between chassis 20 and upper link 25 to generate a signal indicative of the hitch position (e.g. height). It will be clear to one skilled in the art that there are many places on the components of the hitch at which a hitch position sensor could be mounted to provide such a signal.

Figure 3:
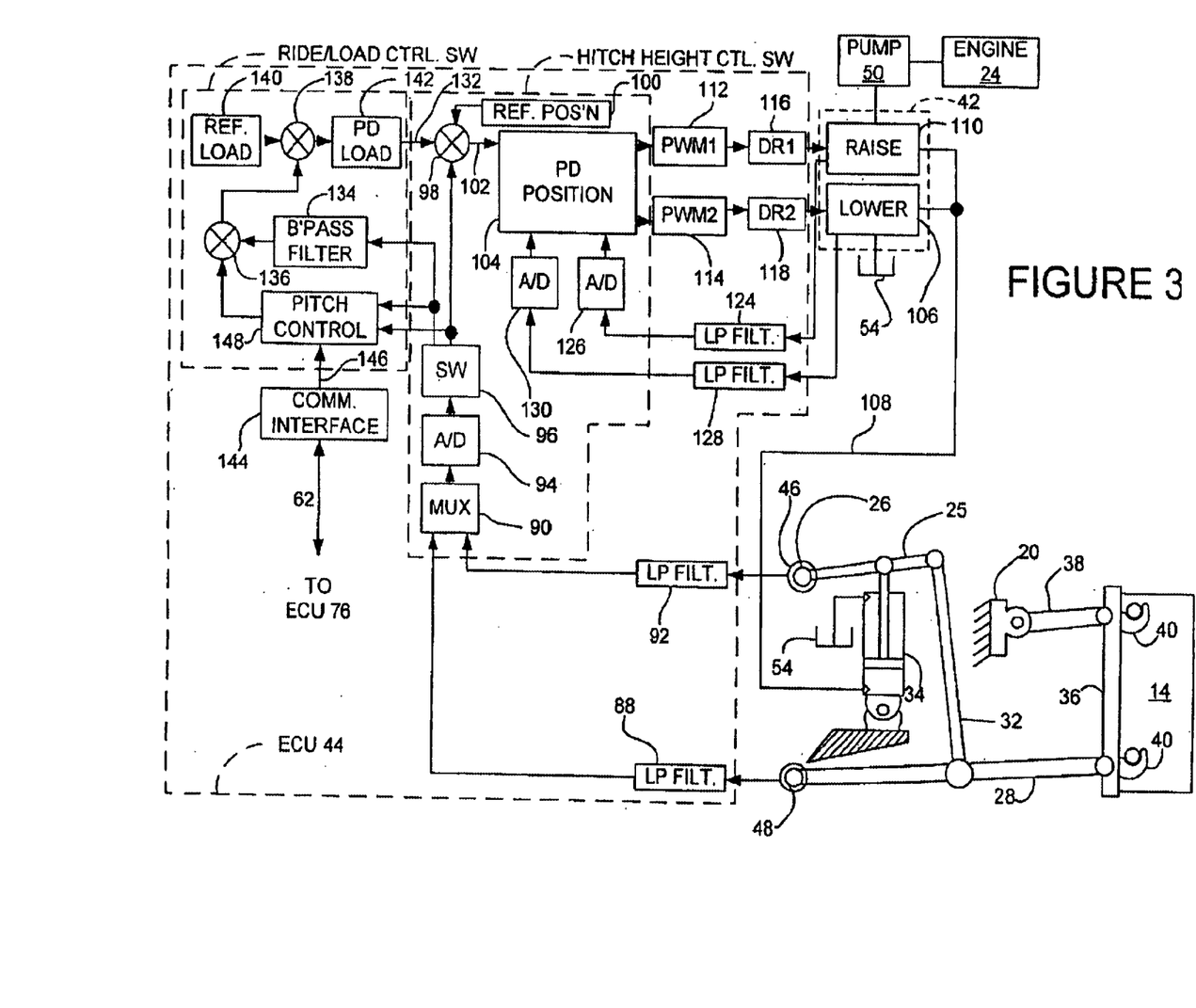
FIG. 3 is a diagram of the control scheme and apparatus for controlling hitch position, ride control and vehicle pitching. The hitch is driven up and down by the hitch raise and lower valves respectively, which are commanded by the microprocessor-based controller via drivers PWM1 and PWM2. In a conventional arrangement, sensors measure the hitch angle or height and hitch loads, producing signals that are processed, and then output by the controller, thereby completing the servo control loop.

When cylinder 34 extends, it rotates upper link 25 in a counter-clockwise direction. This counter-clockwise rotation of upper link 25 with respect to chassis 20 rotates potentiometer 46 thereby causing its signal to change. In a similar fashion, when cylinder 34 retracts, upper link 25 rotates in a clockwise direction with respect to chassis 20. This causes potentiometer 46 to rotate in the opposite direction and generate a signal indicative of the lowered position of the hitch. The signal generated by potentiometer 46 is transmitted to ECU 44 over the electrical lines coupling the two and thereby provides ECU 44 with an indication of the hitch position.

In a similar fashion, ECU 44 is also coupled to a load sensor that generates a signal indicative of the load on the hitch. This load sensor, shown in FIG. 1 as load pin 48, generates an electrical signal indicative of the load exerted by the hitch and implement 14 on chassis 20 of the vehicle. As the load changes, whether due to increased mass, inertia or acceleration, the signal provided by load pin 48 changes accordingly. Load pin 48 is coupled to ECU 44 by an electrical signal line extending between load pin 48 and ECU 44.

While the load sensor is preferably a load pin, as shown in FIG. 1, it should be clear to one skilled in the art that a variety of other load sensors will be equally as effective and may be mounted at a variety of locations on the components of the hitch.

Valves 42 receive pressurized hydraulic fluid from pump 50. Pump 50 is coupled to and driven by engine 24 to provide a supply of pressurized hydraulic fluid. Pump 50 is fluidly coupled to valves 42 by hydraulic fluid conduit 52 that extends between and is coupled to both pump 50 and valves 42. Hydraulic fluid exhausted from cylinder 34 through valves 42 is returned to a hydraulic fluid reservoir or tank 54.

In addition to hitch 12, tractor 10 has a second articulating mechanism: front suspension 16. Front suspension 16 is shown symbolically as a hydraulic actuator coupled to a suspension linkage 82, which, in turn, is coupled to front wheels 18. When hydraulic actuator 56 (exemplified in FIG. 1 as a hydraulic cylinder) is extended, it moves wheels 18 farther away from chassis 20. When hydraulic cylinder 56 is retracted, it moves wheels 18 closer to chassis 20. When wheels 18 are resting on the ground, extending hydraulic cylinder 56 raises the front end of tractor 10. When cylinder 56 is retracted, it lowers the front end of tractor 10.

It should be clear to one skilled in the art that numerous other front suspensions that permit wheels 18 to move up and down with respect to chassis 20 are possible. What is important is that there is at least one hydraulic actuator, such as cylinder 56, that causes wheels 18 to move away from or closer to chassis 20. The particular arrangement of the suspension components forms no part of this invention and thus is represented here schematically as a simple hydraulic cylinder 56.

Cylinder 56 has two ports that are connected to electro-hydraulic circuit 58. Electro-hydraulic circuit 58 is shown in more detail in FIG. 2 herein. Electro-hydraulic circuit 58, in turn, is fluidly coupled to pump 50 via conduit 60 to receive a flow of hydraulic fluid under pressure. Electro-hydraulic circuit 58 is also coupled to ECU 44 via CAN-bus 62. CAN-bus 62 is a serial communications link that sends data to and from ECU 44 and electro-hydraulic circuit 58. Most particularly, for the present application, CAN-bus 62 receives a front suspension position signal from electro-hydraulic circuit 58 and transmits it to ECU 44 to be combined with the load signal provided by load sensor 48 and the hitch position signal provided by hitch position sensor 46 in order to generate the electrical signals at valves 42, which in turn cause cylinder 34 to extend or retract. Electro-hydraulic circuit 58 receives front suspension position signals from front suspension sensor 64 to which it is coupled. One skilled in the art will recognize that there are numerous sensors capable of generating a signal indicative of the extension of front suspension 16. Electro-hydraulic circuit 58 receives the signal generated by front suspension position sensor 64 and transmits it over CAN-bus 62 to ECU 44.

In operation, whenever cylinder 56 extends, it causes wheels 18 to move away from chassis 20. This, in turn, raises the front of tractor 10 higher off the ground. At the same time, the elevation of the front suspension is sensed by front suspension position sensor 64, which generates a signal that indicates the new height of suspension 16. This signal is provided to electro-hydraulic circuit 58 and thence to ECU 44 for further processing.

Electro-hydraulic circuit 58 is also coupled to hydraulic fluid reservoir or tank 54. Fluid provided by pump 50 is conveyed through conduit 60 to electro-hydraulic circuit 58 and thence into hydraulic cylinder 56 to raise or lower the front suspension. Fluid exhausted from hydraulic cylinder 56 is conveyed to electro-hydraulic circuit 58 and thence to reservoir 54.

Figure 2:
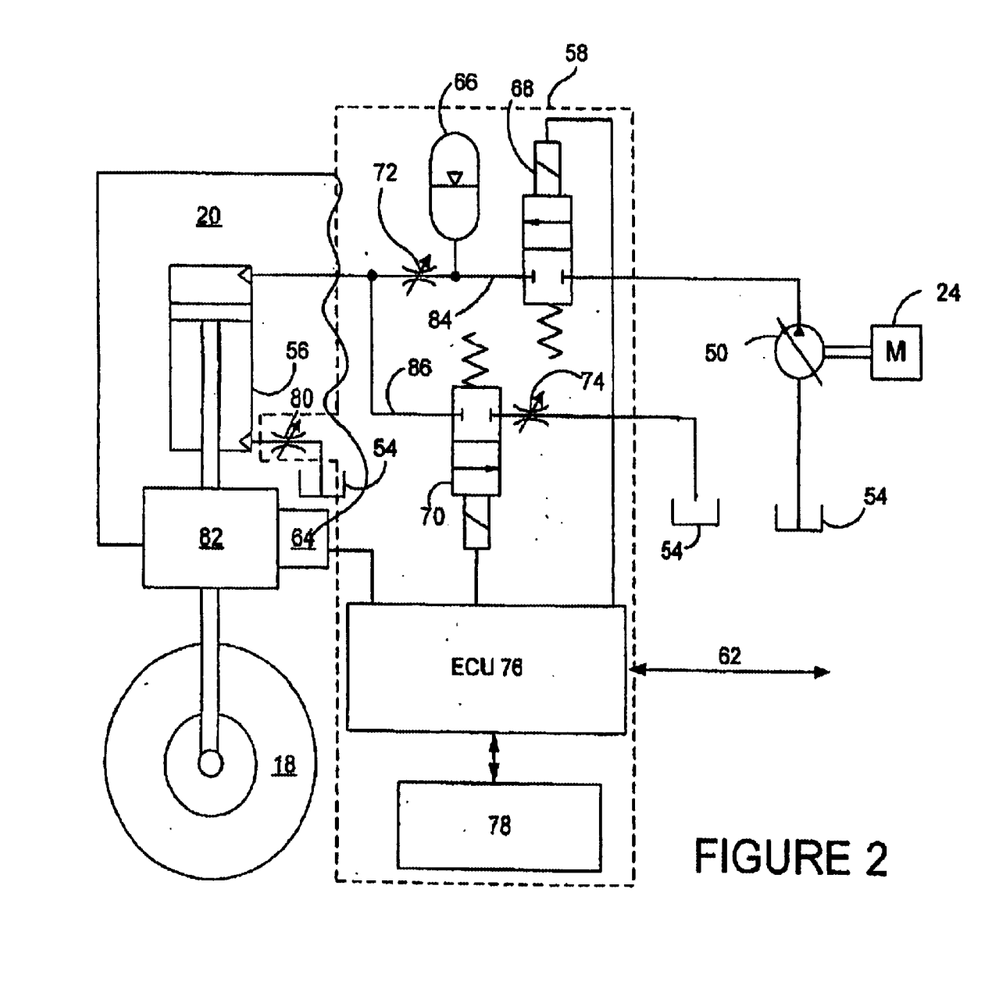
FIG. 2 is a detailed view of the front of the vehicle showing the front suspension and its associated components.

FIG. 2 illustrates the front suspension and the electro-hydraulic circuit 58 in greater detail. As in FIG. 1, electro-hydraulic circuit 58 is coupled to pump 50, tank 54, hydraulic cylinder 56, and position sensor 64. Electro-hydraulic circuit 58 includes an accumulator 66, a raise valve 68, a lower valve 70, a raise orifice 72, a lower orifice 74, an electronic control unit (ECU) 76, an operator command console 78, and a raise and lower orifice 80.

ECU 76 is electrically coupled to and drives raise valve 68 and lower valve 70. ECU 76 receives the signal indicative of front suspension position (height) from front suspension position sensor 64. Sensor 64 is coupled to front suspension linkage, which is coupled to and between front wheels 18 and hydraulic cylinder 56. Cylinder 56 is coupled to the front portion of tractor chassis 20.

To raise the front suspension (i.e., to extend hydraulic cylinder 56 and thereby force wheels 18 farther away from chassis 20) raise valve 68 is energized by ECU 76. When this happens, hydraulic fluid from pump 50 travels through conduit 84, through raise orifice 72, and into one port of cylinder 56. This causes the piston in cylinder 56 to move downward. This, in turn, forces fluid out of a second port in cylinder 56, through raise/lower orifice 80, and back to tank 54.

In a similar fashion, when ECU 76 energizes lower valve 70, the weight of tractor 10 forces the piston in cylinder 56 upward. This produces a partial vacuum that draws fluid from reservoir 54 through raise/lower orifice 80 and into the lower port of cylinder 56. At the same time, it forces hydraulic fluid out of the upper port of cylinder 56 through conduit 86, through lower valve 70, through lower orifice 74, and returns the fluid to tank 54.

ECU 76 is programmed to continuously monitor the position of the front suspension via position sensor 64. ECU 76 averages the position signals generated by sensor 64 to determine an average front suspension position. If this average position falls outside of a predetermined range of positions, ECU 76 energizes either raise valve 68 or lower valve 70 in order to raise or lower the suspension. It raises and lowers until the average position of the front suspension again falls within the desired range of front suspension positions, at which point it de-energizes (i.e., closes) both raise valve 68 and lower valve 70.

Accumulator 66 provides the "springing" of the front suspension. It is preferably a gas-charged hydraulic fluid accumulator that is coupled to and between the raise and lower valves and the raise port of cylinder 56. As tractor 10 is driven over rough terrain, and the ground responsively exerts a varying upward force on wheels 18, fluid is forced out of the upper portion of cylinder 56 and into accumulator 66 through orifice 72. As the force exerted by the ground decreases, the gas charge in accumulator 66 forces fluid from accumulator 66, through orifice 72 and back into the raise port of cylinder 56.

Thus, ECU 76 uses the front suspension position signal provided by sensor 64 to control the position (i.e. height) of the front suspension itself. ECU 76 performs the additional function of transmitting the front suspension position signal to ECU 44 over CAN-bus 62. It is this transmitted front suspension position signal that ECU 44 uses in combination with the hitch position signal from sensor 46 and the load signal from load sensor 48 to drive valves 42.

FIG. 3 illustrates ECU 44 in greater detail, showing the software functions performed by its internal microprocessor as well as several electronic components to condition the signals received from hitch position sensor 46 and load sensor 48.

Load sensor 48 generates a signal that is passed through low pass filter 88 and is then provided to multiplexer 90. Similarly, the signal from hitch position sensor 46 is provided to low pass filter 92 and thence to multiplexer 90 as well. These two analog signals are provided to analog-to-digital converter 94 and are converted into digital form. All further manipulation of the signals is provided by software executed by the microprocessor in ECU 44. In software block 96, software controlling ECU 44 separates the signal into a hitch position component that is provided to summation block 98 and a hitch load component. Summation block 98 combines the actual hitch position from block 96 with a reference hitch position from block 100 to provide a position error signal on line 102 to software block 104. The error signal provided on line 102 is proportional to the hitch position error. The position error is the distance between the actual hitch position and the reference or desired hitch position. The reference position (block 100) is preferably around the mid-point of the hitch position travel. Thus, when the hitch is exactly at the reference position, the hitch position error on line 102 provided to block 104 is zero. Software block 104 includes a conventional feedback control algorithm (e.g. a PD algorithm) configured to drive the raise valve 110 and the lower valve 106 to move the hitch toward the referenced position. Thus, if the signal on line 102 indicates that the hitch is too high, the feedback control algorithm in block 104 tends to open the lower valve 106. When lower valve 106 is opened, fluid is conducted from the bottom of the piston and actuator 34 through conduit 108 through lower valve 106 and back to tank 54. This lowers the hitch.

Similarly, if the position error on line 102 indicates that the hitch is too low, the feedback control algorithm in block 104 is configured to generate a signal that energizes raise valve 110. When raise valve 110 is energized and opened, hydraulic fluid under pressure from pump 50 passes through raise valve 110, through conduit 108 and into cylinder 34. This raises the hitch. The valve raise and valve lower signals generated by software block 104 are converted into pulse width modulated (PWM) signals in blocks 112 and 114, respectively. These pulse width modulated signals are then provided to valve driver circuits 116 and 118 and thence are respectively applied to raise valve 110 and lower valve 106.

Software block 104 also includes a compensation circuit responsive to the current passing through the coils of the raise and lower valves. It includes a feedback control algorithm that adjusts the values of the signals provided to PWM circuits 112 and 114. A signal indicative of the current passing through the coil of raise valve 110 is low pass filtered in block 124, digitized in analog-to-digital converter 126 and provided to software block 104. In a similar fashion, a signal indicative of the current passing through the coil of lower valve 106 is provided to low pass filter 128 and thence is digitized in analog-to-digital converter 130 and is provided to software block 104. The computer circuit in software block 104, in turn, compensates for changes in valve coil resistance due to raise valve and lower valve heating.

Software block 104, therefore, is responsive to a hitch position error and tends to drive the hitch to a position that minimizes that error. This is the primary function of the software block identified as "hitch height control software" that is executed by ECU 44.

Referring back to summation block 98, the reader will see that an additional signal is applied to that block in addition to the reference position and the actual position of the hitch. This signal, expressed in units of position, is a short-term position signal that is superimposed on the existing position reference signal. Its function is to compensate for and reduce pitching or other unwanted oscillation of the tractor. For example, if the rear wheels of the tractor go over a large bump, they will force the tractor upward. This sudden upward acceleration of the tractor by forces acting at the rear wheels causes an equal and opposite reaction that appears as a sudden increase in load on load sensor 48. If the rear wheels fall into a rut, and the tractor is suddenly lowered, the inverse is true: the load sensor registers a sudden decrease in load.

When an increased or decreased load is suddenly applied to the hitch by the implement, the tractor moves in a manner that is quite uncomfortable to the operator. Often, this short-term load change causes the front end of the tractor to pitch upwards or downwards. It may be so extreme that the front wheels are actually lifted off the ground. This is extremely undesirable. It is the function of the short-term position signal provided on signal line 132 that is introduced into summation block 98 to compensate for short-term load changes.

The software block identified in FIG. 3 as "ride/load control software" calculates the short-term position signal: the correction signal that is provided to summation block 98. Generally speaking, the function of the "ride/load control software" portion of ECU 44 is to monitor the load signal provided by load sensor 48, the hitch position signal provided by position sensor 46, and the front suspension position signal provided over CAN-bus 62 by ECU 76 (see FIG. 2) and to generate therefrom the short term position signal that is applied to summation block 98.

As described above, software block 96 separates the position signal from the load signal that it receives from the analog-to-digital converter 94 and provides the load signal to band pass filter 134. The frequencies of interest, i.e. those short-term load fluctuations are between 1 and 3 Hz. Hence, the band pass filter 134 passes the 1–3 Hz component of the load signal. These filtered load signal values are then provided to summation block 136 that transmits them to summation block 138. Summation block 138 combines the filtered load signals with a reference load signal provided by block 140 and conveys the combined signal (i.e. the load error) to software block 142.

Software block 142 includes a feedback control algorithm designed to calculate the appropriate short-term position signal based upon the sensed load at load sensor 48. Generally speaking, when load sensor 48 senses a sudden spike—a sudden increase in load—ECU 44 compensates for the spike by opening lower valve 106. In other words, when the rear wheel of the tractor is forced upward, such as by passing over a bump, the tractor begins to rise and the lower valve 106 opens to permit the implement to move downwards with respect to the tractor. This permits the implement to drop and reduces the load sensed at load pin 48. This decoupling of the implement and hitch inertia reduces the tendency of the tractor to pitch upward and lift the front wheels off the ground.

To do this, the feedback control algorithm in block 142 generates a short-term position signal. Whenever the hitch is too high, the feedback control algorithm in software block 104 tends to open lower valve 106. This position offset (i.e., the short-term position signal) is calculated by block 142 and is applied to summation block 98 over line 132. The short-term position signal effect fools the feedback control algorithm in block 104 into believing that the hitch is even higher than it actually is. As a result, the feedback control algorithm in block 104, which controls hitch height, opens the lower valve 106 even more.

The inverse is true as well. When the rear wheels of the tractor fall into a hole or a rut, and the tractor moves downwards, the hitch load sensed by load sensor 48 will drop. Feedback control algorithm in block 142 calculates a short term position signal that, when applied to summation block 98 and thence to the feedback control algorithm in block 104 will cause raise valve 110 to be opened more than is necessary to merely control the height, thereby raising the hitch with respect to the tractor.

The short-term position signal provided by software block 142 fools the feedback control algorithm in software block 104 into believing the hitch is even lower than it should be. In response to this even lower position, block 104 generates a greater PWM signal that it applies to raise valve 110. This causes a greater amount of fluid to flow into cylinder 34 thereby raising the hitch.

In the description above, we have seen how ECU 44 through its internal programming generates valve signals that both position the hitch closer to its reference position and adjust the load measured by load sensor 48 by alternatively coupling and decoupling the implement and hitch inertia from the tractor. ECU 44 combines a hitch position signal and the load signal provided by hitch position sensor 46 and load sensor 48, respectively, to generate a combined value.

There is an additional signal that is used to control the position of hitch 12, and that is the front suspension position signal provided by ECU 76 over CAN-bus 62. ECU 76 samples front suspension position sensor 64 at regular intervals, preferably at least once every twenty milliseconds. More preferably, it samples the front suspension position sensor every ten milliseconds. It transmits the sampled front suspension position signal over CAN-bus 62 to ECU 44.

CAN-bus 62 is coupled to communications interface circuit 144 that receives the packets of digitized data transmitted over the CAN-bus, extracts the front suspension position signal data and provides it over signal line 146 to pitch control software block 148. The pitch control software block 148 receives the hitch position signal from software block 96 and the hitch load signal from software block 96 as well.

The pitch control software represented by block 148 combines these signals with front suspension signal provided on line 146 and generates a compensating load signal that it conveys to software summation block 136. The compensating load signal provided to summation block 136 is configured to reduce tractor pitching.

Generally speaking, when software block 148 receives a front suspension position signal that indicates the front suspension is near fully extended (a condition that exists when the front of the tractor is about to lift off the ground) it calculates a signal expressed in units of load that tends to open lower valve 106. As described above, whenever lower valve 106 is opened, the inertia of the implement is decoupled from the tractor and the implement begins to fall. This, in effect, "disconnects" the inertial load of the implement from the tractor. Without this load, the front of the tractor will tend to fall back toward the earth. This, in turn, presses the front wheels more firmly against the ground and thereby reduces pitching.

When the front suspension is at or near its full height as indicated by position sensor 64, software block 142 generates a short-term position signal that tends to open lower valve 106 or decrease the degree of opening of raise valve 110. Pitch control software block 148 adjusts response of the feedback control algorithm in block 142 by providing a short-term load signal to summation block 136. This signal is summed with the actual load signal provided by band pass filter 134, and indicates to software block 142 that there is a substantially greater load on the hitch than actually exists. Software block 142, in turn, calculates a short-term position signal that indicates an even greater height. Block 104, in response to this even greater height, opens lower valve a little more or closes raise valve 110 a little more.

Figure 4:
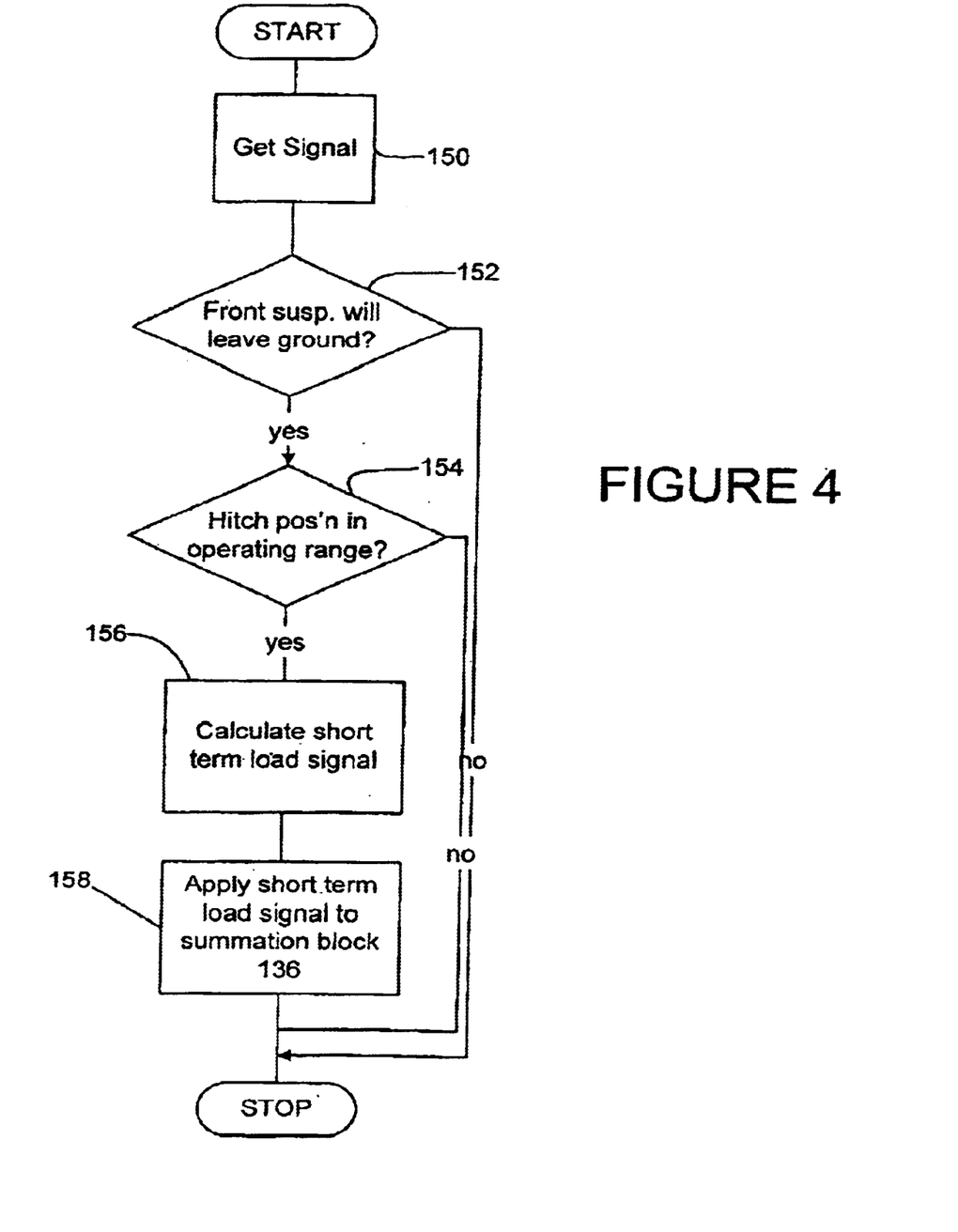
FIG. 4 is a flow chart of the operation of the electronic control system of the vehicle indicating the manner in which it controls pitching based upon a signal from the front suspension sensor.

Pitch control software block 148 generates the short-term load signal in the following manner as shown in FIG. 4. In Step 150, software block 148 retrieves the front suspension position signal from ECU 76. In block 152, the pitch control program in block 148 applies the actual front suspension position to a dynamic model that predicts (using the extension dynamics) when the front wheel ground reaction force is approaching zero, i.e. whether the front wheels are about to leave the ground.

If the front wheels are predicted to leave the ground, the pitch control software in block 148 then compares the actual hitch position (which is receives from software block 96) to see whether the hitch is generally in the middle of its range in block 154. If the hitch is too low, opening lower valve 106 may permit the hitch to bang against-its lower stop or, alternatively, causes the implement to gouge into the road or field over which the tractor is traveling.

If the hitch is in an acceptable range of positions, pitch control software block 148 calculates the short-term load signal to open the lower valve 106 and permit the implement's inertia to be decoupled from the tractor. In block 158, pitch control software block 148 applies this short-term load signal to summation block 136.

All of the calculations, signal sampling and signal generation described above are repeatedly executed at a rate of at least once every 50 milliseconds. More preferably they are executed at a rate of at least once every 20 milliseconds. Even more preferably they are executed at least once every 10 milliseconds.

Thus the applicant has provided a ride control system that alleviates vehicle pitching, and that combines a load sensor signal, a hitch position sensor signal and a front suspension position sensor signal to do so.

What is claimed is:

1. A tractor having a ride control system that alleviates tractor pitching, comprising:

a chassis;

an engine mounted on the chassis;

a hydraulic pump coupled to and driven by the engine to provide a flow of pressurized hydraulic fluid;

a front suspension including two front wheels disposed on opposing sides of the chassis and supported by at least one front suspension hydraulic actuator configured to raise and lower the two front wheels with respect to the chassis;

a front suspension sensor coupled to the front suspension to generate a signal indicative of the position of the front suspension with respect to the chassis;

two rear wheels coupled to the chassis to rotate with respect thereto and drive the tractor over the ground;

a multi-point hitch coupled to the rear of the chassis and configured to be coupled to an overhanging load extending from the rear of the chassis;

a hitch position sensor coupled to the hitch to provide a signal indicative of an elevation of the hitch with respect to the chassis;

a hitch hydraulic actuator coupled to the hitch to raise and lower the hitch with respect to the chassis;

a load sensor coupled to the chassis to provide a signal indicative of a load on the hitch;

at least one electrically actuated hitch control valve coupled to and between the pump and the hitch hydraulic actuator to regulate the flow of pressurized hydraulic fluid to the hitch hydraulic actuator;

an electronic control circuit coupled to and responsive to the front suspension sensor, the load sensor, the hitch position sensor, and the hitch control valve to control the flow of pressurized hydraulic fluid to the hitch hydraulic actuator in real time to alleviate tractor pitching.

2. The tractor of claim 1, wherein the electronic control circuit includes at least one feedback control circuit configured to automatically, periodically, and repeatedly receive the signals of the front suspension sensor, the load sensor and the hitch position sensor, to combine the signals, to generate a valve control signal therefrom, and to apply the valve control signal to the hitch control valve to vary a degree of opening of the hitch control valve.

3. The tractor of claim 2, wherein the electronic control circuit is configured to sample the signals of the front suspension sensor, the load sensor and the hitch position sensor at least once every 50 milliseconds and to generate the valve control signal at least once every 50 milliseconds.

4. The tractor of claim 3, further comprising at least one front suspension hydraulic control valve coupled to and between the pump and the at least one front suspension hydraulic actuator to control the height of the front suspension, and further wherein the front suspension hydraulic control valve is coupled to and driven by the electronic control circuit.

5. The tractor of claim 4, wherein the electronic control circuit includes:
a first digital microprocessor coupled to the front suspension control valve and the front suspension sensor; and
a second digital microprocessor coupled to the hitch position sensor and the load sensor; and
a CAN bus coupling the first and second digital microprocessors and configured to transmit the signal indicative of the position of the front suspension with respect to the chassis from the first digital microprocessor to the second digital microprocessor.

6. The tractor of claim 5, wherein the second microprocessor is coupled to the hitch control valve and is configured to receive the signal indicative of the position of the front suspension over the CAN bus, to combine that signal with the hitch position sensor signal and the load sensor signal, to generate a valve control signal therefrom, and to apply the valve control signal to the hitch control valve to vary a degree of opening of the hitch control valve.

7. A method of electronically reducing pitching in a tractor, comprising the steps of:
(a) receiving an electrical signal from a front suspension sensor indicating the position of a front suspension;
(b) receiving an electrical signal from a hitch position sensor indicating the height of a hitch with respect to a chassis;
(c) receiving an electrical signal from a load sensor indicative of a load experienced by the hitch;
(d) combining the front suspension sensor signal, the hitch position sensor signal and the load sensor signal;
(e) generating a hitch hydraulic actuator signal calculated to drive the hitch upward or downward with respect to the chassis; and
(f) driving the hitch upward or downward with respect to the chassis to thereby reduce tractor pitching.

8. The method of claim 7, wherein steps (a)–(f) are automatically and repeatedly executed at least once every 50 milliseconds.

9. The method of claim 8, further including the step of transmitting the front suspension sensor signal from a first microprocessor to a second microprocessor that is coupled to the hitch position sensor, and further wherein the step of combining includes the step of combining the front suspension sensor signal, the hitch position sensor signal and the load sensor signal in the second microprocessor.

10. The method of claim 9, wherein the step of generating a hitch hydraulic actuator signal includes the step of generating the hydraulic actuator signal in the second microprocessor and applying the hydraulic actuator signal to a valve that is fluidly coupled to and between a hydraulic pump and a hitch hydraulic actuator to regulate a flow of hydraulic fluid from the pump to the actuator.

11. A work vehicle having a ride control system that alleviates vehicle pitching, comprising:
a chassis;
an engine mounted on the chassis;
a hydraulic pump coupled to and driven by the engine to provide a flow of pressurized hydraulic fluid;
a front suspension including two front wheels disposed on opposing sides of the chassis and supported by at least one front suspension hydraulic actuator configured to raise and lower the two front wheels with respect to the chassis;
a front suspension sensor coupled to the front suspension to generate a signal indicative of the position of the front suspension with respect to the chassis;
two rear wheels coupled to the chassis to rotate with respect thereto and drive the vehicle over the ground;
a hitch coupled to the rear of the chassis and configured to be coupled to an overhanging load extending from the chassis;
a hitch position sensor coupled to the hitch to provide a signal indicative of an elevation of the hitch with respect to the chassis;
a hitch hydraulic actuator coupled to the hitch to raise and lower the hitch with respect to the chassis;
a load sensor coupled to the chassis to provide a signal indicative of a load on the hitch;
at least one electrically actuated hitch control valve coupled to and between the pump and the hitch hydraulic actuator to regulate the flow of pressurized hydraulic fluid to the hitch hydraulic actuator;
an electronic control circuit coupled to and responsive to the front suspension sensor, the load sensor, the hitch position sensor, and the hitch control valve to control the flow of pressurized hydraulic fluid to the hitch hydraulic actuator in real time to alleviate vehicle pitching.

12. The work vehicle of claim 11, wherein the electronic control circuit includes at least one feedback control circuit configured to automatically, periodically, and repeatedly receive the signals of the front suspension sensor, the load sensor and the hitch position sensor, to combine the signals, to generate a valve control signal therefrom, and to apply the valve control signal to the hitch control valve to vary a degree of opening of the hitch control valve.

13. The work vehicle of claim 12, wherein the electronic control circuit is configured to sample the signals of the front suspension sensor, the load sensor and the hitch position sensor at least once every 50 milliseconds and to generate the valve control signal at least once every 50 milliseconds.

14. The work vehicle of claim 13, further comprising at least one front suspension hydraulic control valve coupled to and between the pump and the at least one front suspension hydraulic actuator to control the extension of the front suspension, and further wherein the front suspension hydraulic control valve is coupled to and driven by the electronic control circuit.

15. The work vehicle of claim 14, wherein the electronic control circuit includes:
- a first digital microprocessor coupled to the front suspension control valve and the front suspension sensor; and
- a second digital microprocessor coupled to the hitch position sensor and the load sensor; and
- a CAN bus coupling the first and second digital microprocessors and configured to transmit the signal indicative of the position of the front suspension with respect to the chassis from the first digital microprocessor to the second digital microprocessor.

16. The work vehicle of claim 11, wherein the electronic control circuit is configured to recognize a front suspension sensor signal indicative of the front wheels lifting off the ground and to operate the hitch responsively.

* * * * *